United States Patent [19]

Willis et al.

[11] Patent Number: 4,887,244
[45] Date of Patent: Dec. 12, 1989

[54] METHOD FOR SEISMIC TRACE INTERPOLATION USING A FORWARD AND BACKWARD APPLICATION OF WAVE EQUATION DATUMING

[75] Inventors: Mark E. Willis, Carrollton; Rambabu P. Ranganayaki, Farmers Branch; Thomas E. Shirley; Stan Y. C. Lee, both of Richardson, all of Tex.

[73] Assignee: Mobil Oil Corporation, New York, N.Y.

[21] Appl. No.: 212,470

[22] Filed: Jun. 28, 1988

[51] Int. Cl.$^4$ .............................................. G01V 1/30
[52] U.S. Cl. ...................................... 367/73; 367/40; 364/421
[58] Field of Search .................. 367/40, 73; 381/6; 364/421, 169, 577

[56] References Cited

U.S. PATENT DOCUMENTS

| | | | |
|---|---|---|---|
| 4,415,999 | 11/1987 | Moeckel et al. | 367/73 |
| 4,594,693 | 6/1986 | Pann et al. | 367/43 |
| 4,613,960 | 9/1986 | Hinkley et al. | 367/40 |
| 4,672,545 | 6/1987 | Lin et al. | 364/421 |
| 4,679,174 | 7/1987 | Gelfand | 367/73 |

OTHER PUBLICATIONS

Shtivelman et al., "Datum Corrections by Wave Equation Extrapolation", 57th Annu. Soc. Exp. Geo. Int. Mtg., 10/15/87.
Berryhill, J. R., "Submarine Canyons: Velocity . . . Stock", Geophysics, vol. 51, #8, pp. 1572–1579, 8/86.
Shtivelman et al., "Datum Correction by Wave Equation Extrapolation", 57th Ann. Sec. Exp. Geo. Int. Mtg., 10/15/87, pp. 454–457.
Higginbothan et al., "Directional Depth Migration", Geophysics, vol. 50, #11, pp. 1784–1789, 11/85.
Waters, K. H., "Reflection Seismology", Lib. TN269W37, 1981, publ. John Wiley & Sons, Inc., pp. 335–341.
Berryhill, John R., "Wave-Equation Datuming"; Geophysics, vol. 44, (1979), pp. 1329–1344.
Berryhill, John R., "Wave-Equation Datuming Before Stack", Geophysics, vol. 49, No. 11, (Nov., 1984), pp. 2064–2066.
Ronen, John, "Wave-Equation Trace Interpolation", Geophysics, vol. 52, No. 7, (Jul., 1987), pp. 973–984.

Primary Examiner—Nelson Moskowitz
Attorney, Agent, or Firm—Alexander J. McKillop; Charles J. Speciale; George W. Hager, Jr.

[57] ABSTRACT

Method of interpolating additional seismic traces between existing seismic traces obtained during the exploration of a subsurface formation. Seismic traces are recorded upon a datum surface in accordance with standard seismic data acquistion methods. Forward and backward wave equation datuming of the data set at the same velocity estimates new measurements for originally acquired data deemed unsatisfactory by propagating measured seismic traces to a fictitious datum plane using wave theory to create a second set of seismic traces and datuming the second set of seismic traces, again using wave theory, back to the original datum plane to create a third set of seismic traces. The third set of seismic traces will include new seismic traces to be used in place of the originally acquired unsatisfactory data.

24 Claims, 4 Drawing Sheets

METHOD FOR SEISMIC TRACE INTERPOLATION USING A FORWARD AND BACKWARD APPLICATION OF WAVE EQUATION DATUMING

BACKGROUND OF THE INVENTION

1. Field of the Invention

This invention relates to a method for interpolating between measured waveforms obtained from an acoustic, elastic or other experiment which obeys the wave equation. Interpolation between measured waveforms is accomplished by successive forward and backward applications of wave equation datuming. This invention further relates to seismic exploration and to a method for seismic trace interpolation by applying wave equation datuming techniques.

2. Description of the Prior Art

Physical experiments are often conducted in which recorded measurements which pertain to the outcome of the physical experiment obey the wave equation. Most often, the measurements recorded in such an experiment are related to the time history of the particle motion, displacement, acceleration or pressure at the location of a transducer. For example, in the field of underwater acoustics, a source may be used to generate sound waves into the ocean. An array of hydrophones towed behind a boat will be used to record the sound waves impinging upon the array. The recorded sound waves, which may be used to provide information regarding the location of objects beneath the ocean surface, will obey the wave equation. In the field of exploration seismology, an example of a physical experiment which obeys the wave equation would be the generation of seismic energy by a source and the use of an array of geophones spread out on the surface of the earth for recording elastic waves which are reflected from the subsurface and which impinge upon the array.

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

Seismograms are commonly recorded as digital samples which represent the amplitude of a received seismic signal as a function of time. Since seismograms are usually obtained along a line of exploration on the surface of the earth, the digital samples can be formed into x-t arrays with each sample in the array representing the amplitude of the seismic signal as a function of horizontal distance and time. When such arrays are visually reproduced, by plotting or the like, seismic sections are produced. A seismic section depicts the subsurface layering of a section of the earth. It is the principal tool which the geophysicist studies to determine the nature of the earth's subsurface formations. Before an array of seismic samples or traces can be converted into a seismic section for interpretation by geophysicists, the array must be extensively processed to remove noise and to make reflection events discernable.

It frequently occurs, however, that insufficient data is recorded data for proper interpretation of the characteristics of the subsurface formation. The most common data insufficiency problem is that the acquired data includes either seismic traces with no recorded data or seismic traces which clearly contain severe noise contamination such as spikes. These and other insufficiencies in the acquired data may be traced to any one of numerous causes. For example, a data insufficiency may result when seismic traces are recorded in the wrong location due to intrabed reflections of the generated seismic energy. Another typical data insufficiency arises when it is determined after seismic exploration has been completed that the collected traces need to be interpolated to a finer spatial sampling for proper interpretation. Here, the selection of too large a spacing between geophones prior to commencing exploration is typically the cause. A seismic trace without data may be produced when one or more geophones fail during exploration. Seismic traces severely contaminated with noise may be inadvertently produced due to multiple reflections or ground roll.

Too often, cost or time restraints will prevent the reshooting of the unsatisfactory data. Under such circumstances, the most acceptable option available to the geophysicist who must complete an evaluation of the formation based upon the insufficient data, is to estimate the missing or bad traces from the set of collected traces.

There are numerous methods for determining estimates of data points from measured physical data which may be classified as interpolation methods. For example, many methods exist for the interpolation of functions which are dependent on only one parameter such as time. These include both the well known linear interpolation methods and the equally well known finite difference interpolation methods. Linear interpolation is based upon the proposition that for an argument "x", the value of a dependent variable "y" will vary linearly over the interval under investigation. Finite difference interpolation methods are based upon the proposition that given "y=f(x)", inverse interpolation may be used in a process for finding "x" at a value of "y" intermediate to two tabulated values. For finite difference interpolation methods, any one of several alternate procedures such as Lagrange's formula, successive approximation, or reversion of series may be used to obtain the desired result.

Standard practice among geophysicists faced with seismic traces which contain either no recorded data or which are severely contaminated has been to exclude such traces, commonly referred to as "null" traces, from the otherwise satisfactory data set. The collected seismic data would be processed using conventional methods without the excluded data. When the missing trace was necessary for proper processing of the seismic data, prior attempts to restore the missing trace and create a trace with events consistent with nearby coherent events focused upon combining traces near the missing trace in the x-t domain to create the missing trace. The use of such prior methods restricted conventional multi-dimensional trace interpolation upon the apparent characteristics of the measured traces and did not permit trace interpolation to use the characteristics of the underlying physical experiment being performed.

The above mentioned trace interpolation methods are inherently 1-dimensional, for example, $f(x)=b$. These methods may not be applied to data sets which are 2 or 3-dimensional, such as f(x,t)=A, or f(x,y,t)=B. For example, a seismic trace measures amplitude as a function of time. Thus, each seismic trace in the gather is used to analyze subsurface formations which are separated by a distance dependent on the location of the geophones along the surface. This spatial variation may be only in one, two or three directions, depending on the location of the geophones utilized in the gather.

Alternate methods to the interpolation methods described above were developed which address the problems of interpolating functions having spatial and temporal dependencies. Too often, however, such alternate methods are based upon the observed statistics of the trace gather rather than upon the physics from which the experiment came. One such conventional solution which relies upon the statistics of the trace gather and is popular in the field of seismic exploration utilizes t frequency-wavenumber transform approach.

In the processing of seismograms, x-t arrays have been transformed into arrays representing amplitude as a function of frequency and wave number. This is commonly referred to as a "frequency-wave number" or "f-k" transformation. The f-k transformation has been used as a tool to study seismic filtering. F-k transforms are routinely used to represent data collected by a large array of sensors. Usually, the f-k representations are computed by Fast Fourier Transforms (hereafter referred to as FFTs) which transform the data from the time and spatial domain to the frequency and wavenumber domain by utilizing the corresponding multi-dimensional Fourier transform. The resulting data representations are parameterized by frequencies, wave numbers (spatial frequencies), amplitudes, and phases. More specifically, for each frequency there is a collection of wave numbers, and for each frequency-wave number pair there is a complex number representative of an amplitude and a phase. The data is then inverse Fast Fourier transformed back to the time and spatial domain. After this inverse transform, the traces have a different spatial sampling and possible a different temporal sampling.

In U.S. Pat. No. 4,594,693 issued to Pann et al, seismic trace interpolation is carried out by inserting zero amplitude traces between the seismic traces in a section where spatial aliasing is a problem. The traces are then transformed into an f-k array. The f-k array is filtered with a filter which rejects samples in a region of frequency and wave number which exhibits aliasing. The filtered f-k array is then transformed back into a seismic section representing amplitude as a function of time and distance. One limitation on the use of such methods, however, it that seismic interpolation using f-k transforms requires that the measured traces be uniformly sampled in space. This requirement of a regular trace spacing limits the usefulness of f-k transforms for seismic interpolation applications.

Finally, it is known to use a technique generally referred to as "velocity replacement" to remove the distortion of information gathered during seismic exploration which is caused by changes in the velocity of seismic energy between irregular, i.e. non-planar, layers in the subsurface formation being explored. Due to the varied characteristics of the layers, seismic energy travels at different velocities in each layer. To remove distortion from seismic data recorded at the surface which has traveled through such an irregular subsurface layer, the seismic data is propagated at a first velocity to a first real datum, corresponding to the bottom of the irregular layer, and then propagated at a second velocity to a second real datum, corresponding to the top of the layer. Further, as each layer in the surface has different characteristics which affect the velocity of seismic energy passing through that layer, the actual velocity of the irregular layer is used as the first velocity, and the velocity of the medium below the layer is used as the second velocity. For this reason, velocity replacement methods have consistently used different velocities for each propagation.

SUMMARY OF THE INVENTION

It is an object of this invention to provide a method of performing trace interpolation using the characteristics of the underlying physical experiment conducted.

It is another object of this invention to provide a method of successively using wave equation datuming in the forward and backward directions for the interpolation of data.

Yet another object of this invention is to provide a method of propagating a data set located at a first datum at a first velocity to a fictitious datum and to repropagate the data at the same velocity to the original datum to interpolate data missing from the original data set.

In accordance with the present invention, there is provided herein a method for interpolating traces between existing traces obtained by an experiment which is governed by the acoustic or elastic wave equation. Such a method is particularly applicable to the interpolation of seismic traces between existing traces obtained during the exploration of a subsurface formation. Traces are recorded or measured upon some datum surface in accordance with standard data acquisition methods for the particular experiment. Forward and backward wave equation datuming of the data set, which typically includes both satisfactory and unsatisfactory data points, utilizes the existing traces to interpolate, i.e. estimate new measurements for the unsatisfactory data originally acquired.

More specifically, the method of the present invention is accomplished by the propagation of existing measured traces to a fictitious datum plane using wave theory. The original traces are thus datumed to the fictitious plane to create a new set of traces. The new traces are propagated, again by the application of wave theory, back to the original datum plane to create a third set of traces. This process is hereby defined as forward and backward wave equation datuming. The third set of traces produced by forward and backward wave equation datuming will include new traces to be used in place of the originally acquired unsatisfactory data.

In an alternate embodiment of the invention, the fictitious datum plane may be located above or below the measurement datum plane. In yet another embodiment of the invention, the contribution to the interpolated trace at the desired location from each original trace may be computed directly without having to specifically compute the traces on the fictitious datum. In still yet another embodiment of the invention, the method of the present invention is applied iteratively. On subsequent iterations, however, the estimate of the desired traces previously determined is included with the original traces when they are datumed a second time to and from the fictitious datum.

The above and other object, advantages and features of the invention will be more readily understood from the following detailed description of the invention, which is provided in connection with the accompanying drawings.

DEFINITION OF TERMS

Figure 1:
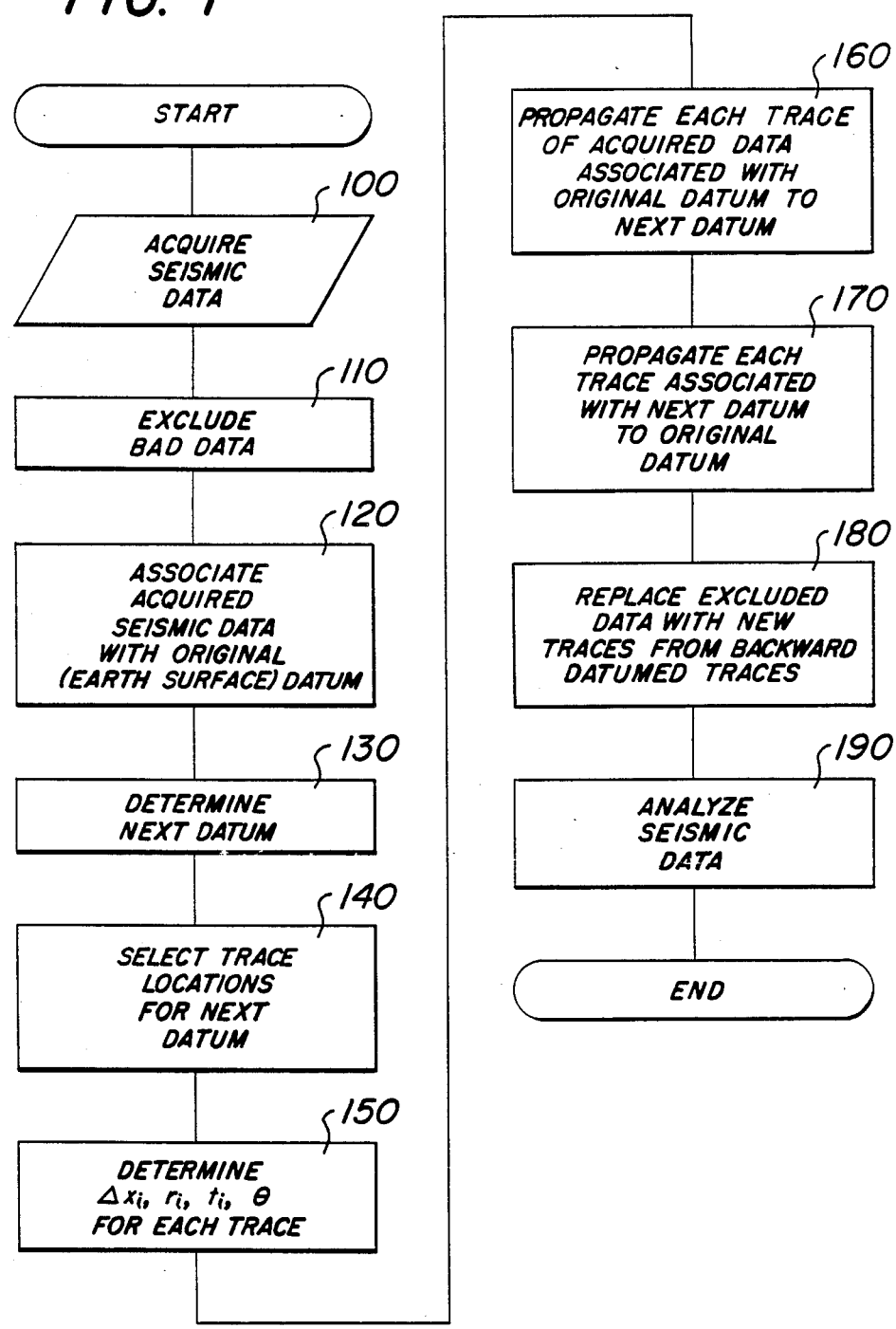
FIG. 1 illustrates, in flow chart form, the method of interpolating traces using a forward and backward application of wave equation datuming of the present invention.

For purposes of this application, the terms "trace" and "seismic trace" refer to the time history of the measurements at a transducer. The terms "trace gather" and "seismic section" refer to the collection of traces from all of the transducers. The term "datum" generally refers to the series of numerical quantities along the "z" axis which serves as a base reference for the seismic traces which take up a seismic section. The term "original datum" refers to the collection of seismic traces acquired during seismic exploration which are placed according to the curvature of the earth's surface. The term "wave equation datuming" refers to as an upward or downward continuation of $U(x, z=z_1, t)$ to produce $U(x, z=z_2, t)$. The term "forward and backward wave equation datuming" refers to the propagation of data from a first datum to a second datum followed by the propagation back to the first datum by successive applications of wave equation datuming techniques using the same velocity.

DESCRIPTION OF THE PREFERRED EMBODIMENT

The purpose of wave equation datuming is to redefine the reference surface on which the sources and receivers appear to be located. Wave equation datuming in two dimensions is accomplished according to the equation:

$$U_{out(t)} = \frac{1}{\pi} \sum_{i} \Delta x_i \cos\theta_i \frac{t_i}{r_i} \overline{Q}(t - t_i) \quad (1)$$

where:

$U_{out(t)}$ is one of a plurality of traces included as part of the output datum;

i is the location of the acquired data traces on the input datum;

$\Delta x_i$ is the separation between adjacent data trace locations for the input datum;

$t_i$ is the traveltime between an input trace on the input datum and an output trace on the output datum;

$r_i$ is the distance between the input trace location and the output trace location;

$\theta_i$ is the angle between $r_i$ and the normal to the input datum; and $\overline{Q}(t-t_i)$ is a representation of the input trace at location i delayed by the traveltime $t_i$ and convolved with a time-domain shaping operator. This shaping operator, for the 2-dimensional case, effects a half derivative of the original input trace, which is equivalent to multiplying each frequency component of the trace by $\sqrt{iw}$, where $i=\sqrt{-1}$, and w is frequency.

Wave equation datuming in three dimensions is accomplished according to the equation:

$$U_{out(t)} = \frac{1}{2\pi} \sum_{i} \sum_{k} \Delta x_i \Delta y_k \frac{\cos\theta_{ik}}{r_{ik}} p(t - t_{ik}) \quad (2)$$

where:

$U_{out(t)}$ is one of a plurality of traces included as part of the output datum;

i is the x location of the acquired data traces on the input datum surface;

k is the y location of the acquired data traces on the input datum surface;

$\Delta x_i$ is the x separation between adjacent data trace locations for the input datum surface;

$\Delta y_k$ is the y separation between adjacent data trace locations for the input datum surface;

$t_i$ is the traveltime between an input trace on the input datum and an output trace on the output datum;

$r_{ik}$ is the distance between the input trace location and the output trace location;

$\phi_{ik}$ is the angle between $r_{ik}$ and the normal to the input datum; and $P(t-t_{ik})$ is a representation of the input trace at x location i and y location k delayed by traveltime $t_{ik}$ and convolved with a time-domain shaping operator. This shaping operator, for the three dimensional case, effects a derivative of the original input trace.

While the method of trace interpolation which follows is described with respect to the interpolation of seismic traces, it should be clearly understood that the application to seismic traces is exemplary only and that the methods of the present invention are equally applicable for the interpolation of missing traces for other collections of data which are related to the acoustic or elastic wave equation.

Figure 2:
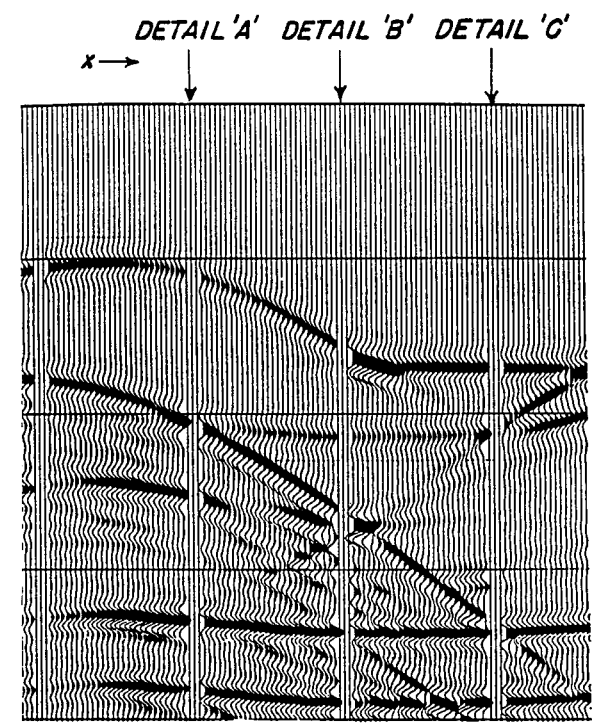
FIG. 2 illustrates a typical seismic gather which includes at least one null trace.

Turning first to FIG. 1, the method of seismic trace interpolation using a forward and backward application of wave equation datuming is hereby described. The method of the present invention commences at step 100 with the acquisition of seismic data using any one of numerous well known seismic exploration techniques. For example, an artificial disturbance may be generated along the earth by the use of dynamite or the like. The resulting acoustic waves travel downwardly in the earth and are reflected upward from subsurface reflecting interfaces. The reflected waves are received at geophones or other detectors located along the surface and recorded in reproducible form as seismograms. Seismic traces which would be acquired by a typical seismic survey may be seen by reference to FIG. 2. FIG. 2 shows the amplitude of seismic reflections as a function of time and distance along a line of exploration in the x direction of the earth's surface. These traces have been gathered into an x-t array commonly referred to as a "seismic section" or "seismic record". During a typical seismic exploration, a seismic trace would be produced for each geophone, the collection of seismic traces making up a seismic gather. For any number of the reasons previously set forth, the seismic gather may include a number of insufficient or otherwise unacceptable seismic traces. For example, FIG. 2 shows at details "a", "b" and "c", unacceptable seismic traces. For traces "a", "b" and "c", a blank or null trace has been substituted in the seismic gather for the original unacceptable seismic trace.

Proceeding to step 110, the insufficient or bad seismic traces are removed from the seismic gather and replaced with null traces. At step 120, the seismic gather it related to the original datum. Preferably, the original datum selected will be the earth surface. The earth surface datum, which should show the variations in the altitude of the earth surface between the geophones along the line of exploration, may be determined using conventional means. Each trace is related to the datum according to the location of the geophone which recorded the corresponding seismic trace.

Proceeding to step 130, a second datum, also referred to as the "fictitious" datum, is selected for later propagation of the seismic traces of the original datum. The selected next datum may be located above or below the original datum and may correspond to any arbitrary line equation. At step 140, the trace locations for the next datum corresponding to the trace locations on the earth datum are selected. Successive traces on the next datum shall be separated by a distance $\Delta x_i$ corresponding to the distance between geophone locations on the earth surface. Proceeding to step 150, $\Delta x_i$, $r_i$ $t_i$ and $\theta_i$ are determined for each trace location on the next datum.

At step 160, propagation of the seismic traces from the original earth datum to the next, or fictitious, datum is commenced using the appropriate calculations as set forth in Equation (1) where the original or earth datum is the input datum and the next or fictitious datum is the output datum. Each seismic trace is forward datumed to the next datum where the fictitious datum may take on any arbitrary shape. In propagating the seismic traces located at the original earth datum to the fictitious next datum, each original trace and each data point included as part of an original trace will provide a component of each next trace produced by propagation of the original data to the next datum. The null traces are not propagated to the fictitious datum and will therefore not contribute to the series of next traces produced by propagation. Propagation of each trace to the fictitious datum continues until all original data traces have been propagated to the next datum. In such a manner, the set of new traces produced for the fictitious datum will include new traces which correspond with the null traces of the original seismic gather.

Figure 3:
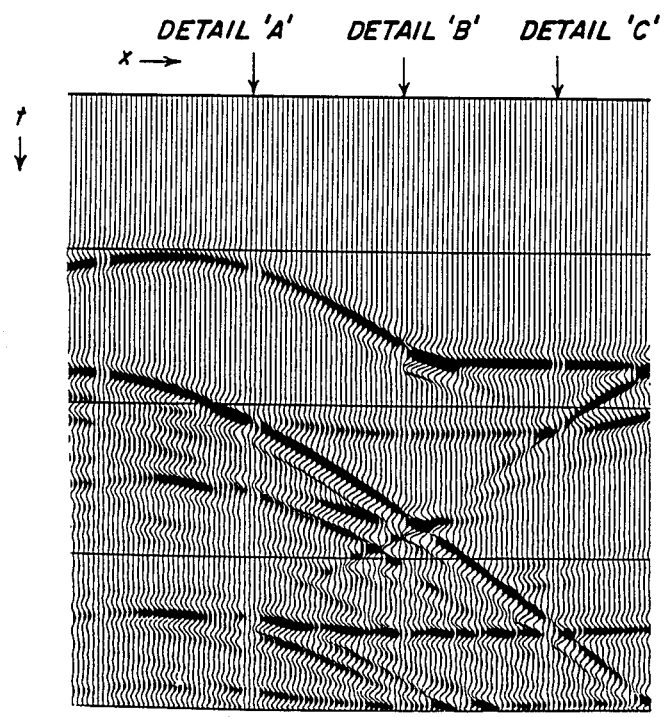
FIG. 3 illustrates the seismic gather of FIG. 2 where the null trace or traces have been replaced by interpolated traces produced according to the method of FIG. 1.

Proceeding to step 170, the set of seismic traces which have been produced by the propagation of the acquired data from the original datum to the fictitious datum are next propagated back to the original datum. Propagation of the produced seismic traces back to the original datum, a step which is also generally referred to as "backward datuming" of the seismic traces, is accomplished using the same calculations set forth in Equation (1) which were required for forward datuming of the original traces to the fictitious datum with the exception that the fictitious datum is now the input datum and the original datum is now the output datum. As before, each input trace and each data point included as part of the input trace will provide a component of each output trace produced by the propagation of produced data to the original datum. Propagation, or backward datuming, of each produced trace back to the original datum continues until all produced data traces have been backward datumed. In such a manner, a second set of new traces which corresponds to the original datum will include traces in place of the original null traces. The traces in the second set of new traces which correspond to the original null traces produced by backward datuming may be seen by reference to details "a", "b" and "c" of FIG. 3. As previously stated, the second set of new traces include traces which had been null prior to the forward and backward datuming steps.

At step 180, the second set of new seismic traces which correspond to the null or otherwise bad traces of the original seismic gather are substituted for the null traces of the seismic gather of FIG. 2. Proceeding to step 190, the seismic gather which include the newly interpolated seismic traces in place of the null traces are processed by any one of the numerous data processing techniques to produce useful information regarding the characteristics of the subsurface formation explored.

Figure 4:
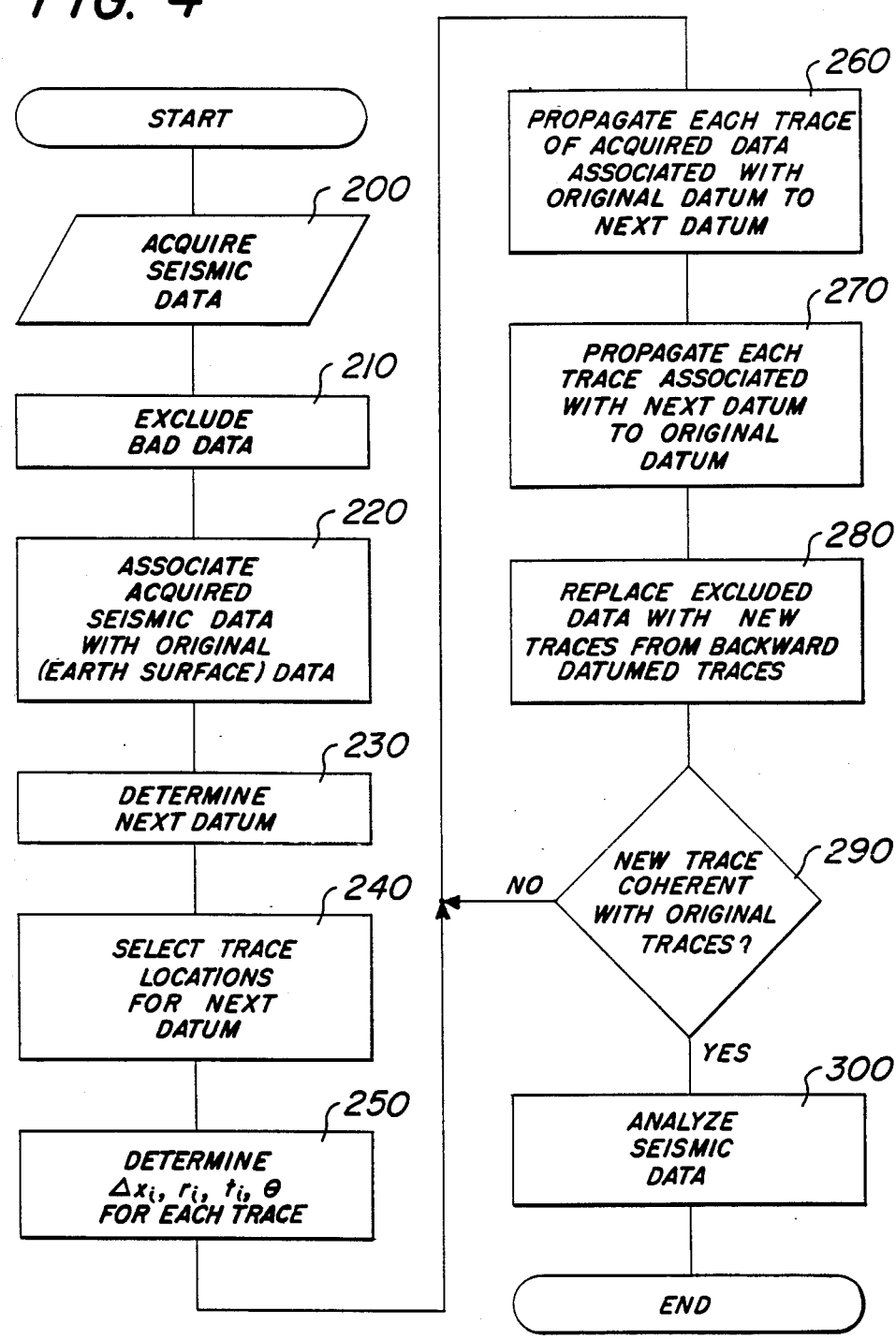
FIG. 4 illustrates, in flow chart form, an alternative embodiment of the method of the present invention.

Turning next to FIG. 4, another embodiment of the present invention of a method for seismic trace interpolation using a forward and backward application of wave equation datuming is hereby described. Commencing at step 200, seismic data is acquired using any one of the previously mentioned well known seismic exploration techniques. Again, it is expected that the seismic gather acquired during exploration will include a number of seismic traces which are either missing or otherwise deemed unacceptable. Proceeding to step 210, the unacceptable traces are removed from the seismic gather and replaced with null traces. Null traces are also inserted into the data set where the missing traces should have been located. At step 220, the seismic gather is placed on an original datum, i.e. the earth's surface.

Proceeding to step 230, a second datum is selected for later propagation of the seismic traces of the original datum. At step 240, the trace locations for the next, fictitious datum corresponding to the trace locations on the original datum are selected. Proceeding to step 250, $\Delta x_i$, $r_i$ $t_i$ and $\theta_i$ are determined for each trace location on the fictitious datum. At step 260, propagation of the seismic traces from the original earth datum to the fictitious datum is commenced using the wave equation datuming techniques where the original datum is the input datum and the fictitious datum is the output datum. The null traces are not, however, propagated to the fictitious datum. Propagation of each trace to the fictitious datum continues until all original data traces have been propagated to the fictitious datum.

Proceeding to step 270, the set of seismic traces which have been produced by the propagation of the acquired data from the original datum to the fictitious datum are next propagated back to the original datum by the aforementioned wave equation datuming techniques where the fictitious datum is the input datum and the original datum is the output datum. Propagation, or backward datuming of each produced trace back to the original datum continues until all produced data traces have been backward datumed. In such a manner, a second set of new traces which corresponds to the original datum and which will include traces in place of the original null traces is produced.

At step 280, the new seismic traces which correspond to the null or otherwise bad traces of the original seismic gather are substituted for the null traces of the seismic gather of FIG. 2. Proceeding to step 290, a determination is made whether the produced data traces are satisfactory for seismic interpretation. If the interpolated traces which replaced the original null traces are satisfactory, the seismic gather which include the newly interpolated seismic traces in place of the null traces are processed at step 300 by any one of the numerous data processing techniques to produce useful information regarding the characteristics of the subsurface formation explored. If the interpolated traces are not satisfactory, the method of the invention returns to step 260 for another propagation of the newly interpolated seismic gather to the fictitious datum followed by the return propagation of the next set of produced traces back to the original datum.

While numerous methods of determining whether a next iteration of the forward and backward datuming steps should be performed, one such method would be to determine whether the interpolated traces produced are coherent with the adjoining original seismic traces. One method of determining coherency would be to measure the amplitude of seismic events on the interpolated trace and the adjoining traces which would suggest to one skilled in the interpretation of seismic gathers to be suggestive of a coherent event and comparing the difference to a preselected reference value. If the difference is less than the preselected reference value, then the interpolated trace may be considered to be coherent and the interpolated trace satisfactory for seismic analysis. The preselected value which would give an accurate determination of coherency would be dependent on the characteristics of the particular seismic gather and may vary depending on factors such as the strength of the coherent event being examined or the size of spatial sampling between traces.

The methods of the present invention which were previously described by reference to the flow charts of FIGS. 1 and 4, while satisfactory, typically require extensive data processing time for the forward and backward datuming of the entire seismic gathers. In yet another embodiment of the present invention, such processing time is reduced by limiting the amount of the seismic sections for which propagation is required. We envision that processing time would be reduced by direct calculation of the contribution to the interpolated trace from each original, non-null trace. Direct calculation of the contribution to the interpolated trace from each original, nonnull trace, a method hereby defined as "redatuming" is determined according to the following equation:

$$X_i(t) = \sum_j \frac{\Delta x_i \Delta x_j}{(2\pi)^2 f_o v} \cdot \frac{\cos\theta_i \cos\theta_j}{r_i \cdot r_j} R\left(t - \frac{r_i - r_j}{v}\right) \quad (3)$$

where:
$\Delta x_i$ is the separation between adjacent data trace locations for the input datum;
$\Delta x_j$ is the separation between adjacent data trace locations on the fictitious datum;
j is the location of the trace on the fictitious datum
$R_i(t-((r_i-r_j)/v))$ is a representation of the original trace at the $i^{th}$ location to which a time shift of $(r_i-r_j)/v$ has been applied and a derivative with respect to time has been taken;
$f_o$ is the center frequency of the input data traces;
$X_i(t)$ is the component of the interpolated trace which is produced by the ith one of the plurality of traces included as part of the original seismic section;
t is time;
$r_i$ is the distance between the original trace location and the jth location on the fictitious datum subject to contribution from the ith original trace;
$r_j$ is the distance between the jth location on the fictitious datum and the location of the interpolated trace;
$\theta_i$ is the angle between $r_i$ and the normal to the original datum;
$\theta_j$ is the angle between $r_j$ and the normal to the fictitious datum; and
v is the velocity in the medium between the original and fictitious datums.

Equation (3) will produce the portion of the interpolated trace which is attributable to the information contained in a single seismic trace of the seismic gather. To produce the entire interpolated trace, the contribution of each seismic trace of the gather to the interpolated trace should be determined and the interpolation data attributable to all of the seismic traces combined.

Thus, there has been described and illustrated herein methods for interpolating missing seismic traces using a forward and backward application of wave equation datuming techniques. However those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

What is claimed is:

1. In seismic exploration wherein seismic sources are activated at spaced locations along a surface of exploration and the amplitude of reflections are recorded as a function of time along said surface to produce a first series of seismic traces, said series of seismic traces including at least one null trace, a method of interpolating seismic data for said at least one null trace comprising the steps of:

relating said first series of seismic traces to a first datum plane;

propagating said series of seismic traces related to said first datum plane to a fictitious second datum plane using forward wave equation datuming to create a second series of seismic traces;

propagating said second series of seismic traces back to said first datum plane using backward wave equation datuming to interpolate seismic data for said at least one null trace; and producing a seismic section for said surface of exploration from said series of seismic traces and said produced seismic data.

2. The method according to claim 1 wherein said first series of seismic traces are propagated from said first datum plane to said second datum plane and said second series of seismic traces are propagated from said second datum plane to said first datum plane at the same velocity.

3. The method according to claim 1 wherein the step of propagating said first series of seismic traces related to said first datum plane to said second datum plane is propagated according to the equation:

$$U_{out(t)} = \frac{1}{2\pi} \sum_i \sum_k \Delta x_i \Delta y_k \frac{\cos\phi_{ik}}{r_{ik}} p(t - t_{ik})$$

where:
$U_{out(t)}$ is one of a plurality of traces included as part of the second series of seismic traces;
i is the x location of the acquired data traces on the first datum plane;

k is the y location of the acquired data traces on the first datum plane;

$\Delta x_i$ is the x separation between adjacent data trace locations for the first datum plane;

$\Delta y_k$ is the y separation between adjacent data trace locations for the first datum plane;

$t_i$ is the traveltime between a trace on the first datum plane and a trace on the second datum plane;

$r_{ik}$ is the distance between the input trace location and the output trace location;

$\phi_{ik}$ is the angle between $r_{ik}$ and the normal to the first datum plane; and $P(t-t_{ik})$ is a representation of the input trace at x location i and y location k delayed by the traveltime $t_{ik}$ and convolved with a time-domain shaping operator where the shaping operator effects a derivative of the original input trace.

4. The method according to claim 1 therein the step of propagating said second series of seismic traces related to said second datum plane to said first datum plane is propagated according to the equation:

$$U_{out(t)} = \frac{1}{2\pi} \sum_i \sum_k \Delta x_i \Delta y_k \frac{\cos\phi_{ik}}{r_{ik}} p(t + t_{ik})$$

where:

$U_{out(t)}$ is on of a plurality of traces included as tart of the second series of seismic traces;

i is the x location of the acquired data traces on the second datum plane;

k is the y location of the acquired data traces on the second datum plane;

$\Delta x_i$ is the x separation between adjacent data trace locations for the second datum plane;

$\Delta y_k$ is the y separation between adjacent data trace locations for the second datum plane;

$t_i$ is the traveltime between a trace on the second datum plane and trace on the first datum plane;

$r_{ik}$ is the distance between the input trace location and the output trace location;

$\phi_{ik}$ is the angle between $r_{ik}$ and the normal to the second datum plane; and $P(t+ti_k)$ is a representation of the input trace at x location i and y location k delayed by the travaltime $t_{ik}$ and convolved with a time-domain shaping operator where the shaping operator effects a derivative of the original input trace.

5. In seismic exploration wherein seismic sources are activated at spaced locations along a line of exploration and the amplitude of reflections are recorded as a function of time along said line to produce a series of seismic traces, said series of seismic traces including at least one null trace, a method of interpolating seismic data for said at least one null trace comprising the steps of:

relating said series of seismic trace to a first datum;

propagating said series of seismic traces related to said first datum to a fictitious second datum using forward wave equation datuming at a first velocity to create a second series of seismic traces;

propagating said second series of seismic traces back to said first datum using backward wave equation datuming at said first velocity to interpolate seismic data for said at least one null trace; and producing a seismic section for said line of exploration from said series of seismic traces and said produced seismic data.

6. The method according to claim 5 wherein said first datum is the surface of the earth along the line of exploration and wherein said step of relating said series of seismic traces to said first datum further comprises the step of relating each of said seismic traces to a location of said geophone along said line of exploration recording said seismic trace.

7. The method according to claim 6 wherein the step of relating each of said seismic traces to a location of said geophone along said line of exploration recording said seismic trace further comprises the steps of:

determining an altitude for each of said geophones along said line of exploration, said first datum comprised of said altitude of said geophones along said line of exploration; and relating each of said seismic traces to said altitude of said geophone recording said seismic trace.

8. The method according to claim 5 wherein the step of propagating said series of seismic traces related to said first datum to said second seismic datum is propagated according to the equation:

$$U_{out(t)} = \frac{1}{\pi} \sum_i \Delta x_i \cos\theta \frac{t_i}{r_i} \overline{Q}(t - t_i)$$

where:

$U_{out(t)}$ is one of said second series of seismic traces i is the location of said first series of seismic traces on said first datum;

$\Delta x_i$ is the separation between adjacent seismic traces locations for said first datum;

$t_i$ is the traveltime between a first seismic trace related to said first datum and a second seismic trace related to said $r_i$ is the distance between said first seismic trace related to said first datum and said second seismic trace related to said second datum;

$\theta_i$ is the angle between $r_i$ and a normal to said first datum; and $\overline{Q}(t-t_1)$ is a representation of said first seismic trace at location i delayed by the traveltime $t_i$ and convolved with a time-domain shaping operator where the shaping operator effects a half derivative of the original input trace which is equivalent to multiplying each frequency component of the trace by $\sqrt{iw}$, where $i=\sqrt{-1}$, and w is frequency.

9. The method according to claim 5 wherein the step of propagating said second series of seismic traces related to said second datum to produce seismic data for said at least one null trace is propagated according to the equation:

$$U_{out(t)} = \frac{1}{\pi} \sum_i \Delta x_i \cos\theta \frac{t_i}{r_i} \overline{Q}(t + t_i)$$

where:

$U_{out(t)}$ is one of said produced seismic traces;

i is the location of said second series of seismic traces for said second datum;

$\Delta x_i$ is the separation between adjacent seismic traces locations for said second datum;

$t_i$ is the traveltime between a first seismic trace related to said second datum and a second seismic trace related to said first datum;

$r_i$ is the distance between said first seismic trace related to said second datum and said second seismic trace related to said first datum;

$\theta_i$ is the angle between $r_i$ and a normal datum; and $Q(t+t_i)$ is a representation of said first seismic trace at location i delayed by the traveltime $t_i$ and convolved with a time-domain shaping operator where the shaping operator effects a half derivative of the original input trace which is equivalent to multiplying each frequency component of the trace by $\sqrt{iw}$, where $i=\sqrt{-1}$, and w is frequency.

10. The method according to claim 5 wherein the step of producing a seismic section for said line of exploration from said series of seismic traces and said produced seismic data further comprises the steps of:
   producing a third series of seismic traces related to said first datum;
   selecting individual seismic traces of said third series of seismic traces corresponding to said null traces; and
   replacing said null traces with said selected seismic traces.

11. The method according to claim 10 further comprising the steps of:
   comparing said selected seismic traces to said surrounding seismic traces;
   determining whether said selected seismic traces are correct interpolations of said null traces based on said comparison; and
   repeating said first propagating step propagating step and said selecting step to produce a next interpolated seismic trace from the new traces if said determining step determines that said selected seismic traces are not correct interpolations of said null trace.

12. The method according to claim 11 wherein said step of comparing said selected seismic traces to said surrounding seismic traces further comprises the step of determining coherency of said selected seismic traces and said surrounding seismic traces.

13. In seismic exploration wherein seismic sources are activated at spaced locations along a line of exploration and the amplitude of reflections are recorded as a function of time along said line to produce a first series of seismic traces, said series of seismic traces including at least one null trace, a method of interpolating seismic data for said at least one null trace by producing an interpolated trace for substitution for said null trace, comprising the steps of:
   relating said first series of seismic traces to a first datum;
   selecting a first one of said series of seismic traces;
   wave equation redatuming said selected seismic trace to a fictitious second datum and back to said null trace on the first datum to produce interpolation data corresponding to said seismic trace;
   selecting a next one of said series of seismic traces;
   repeating said selecting and wave equation redatuming steps until all of said series of seismic traces have produced interpolation data corresponding to the respective seismic trace;
   combining said interpolation data corresponding to said respective seismic traces to produce said interpolated trace; and
   producing a seismic section for said line of exploration from said series of seismic traces and said produced seismic data.

14. The method according to claim 13 wherein said first datum it the surface of the earth along the line of exploration and wherein said step of relating said series of seismic traces to said first datum further comprises the step of relating each of said seismic traces to a location of said geophone along said line of exploration recording said seismic trace.

15. The method according to claim 14 wherein the step of relating each of said seismic traces to a location of said geophone along said line of exploration recording said seismic trace further comprises the steps of:
   determining an altitude for each of said geophones along said line of exploration, said first datum comprised of said altitude of said geophones along said line of exploration; and
   relating each of said seismic traces to said altitude of said geophone recording said seismic trace.

16. The method according to claim 13 wherein the step of redatuming said selected seismic trace to produce interpolation data corresponding to said seismic trace is determined according to the equation:

$$X_i(t) = \sum_j \frac{\Delta x_i \Delta x_j}{(2\pi)^2 \cdot v \cdot f_0} \cdot \frac{\cos\theta_i \cos\theta_j}{r_i \cdot r_j} R\left(t - \frac{r_i - r_j}{v}\right)$$

where:
   $x_i$ is the separation between adjacent data trace locations on the original datum;
   $x_j$ is the separation between adjacent data trace locations on the fictitious datum;
   j is the location of the trace on the fictitious datum
   $R_i(t-((r_i-r_j)/v))$ is a representation of the original trace at the $i^{th}$ location to which a time shift of $(r_i-r_j)/v$ has been applied and a derivative with respect to time has been taken;
   $f_0$ is the center frequency of the input data traces;
   $X_i(t)$ is the component of the interpolated trace which is produced by the ith one of the plurality of traces included as part of the original seismic section;
   t is time;
   $r_i$ is the distance between the original trace location and the jth location on the second datum subject to interpolation data corresponding to the ith original trace;
   $r_j$ is the distance between the jth location on the second datum and the location of the interpolated trace;
   $\theta_i$ is the angle between $r_i$ and the normal to the first datum;
   $\theta_j$ is the angle between $r_j$ and the normal to the second datum; and
   v is the velocity in the medium between the first and second datums.

17. The method according to claim 16 further comprising the steps of:
   comparing said interpolated seismic trace to said surrounding seismic traces;
   determining whether said interpolation trace is satisfactory based on said comparison; and
   repeating said selecting, redatuming and repeating steps to produce a next interpolated seismic trace if said determining step determines that said interpolated trace is not satisfactory.

18. The method according to claim 17 wherein said step of comparing said selected seismic traces to said surrounding seismic traces further comprises the step of determining coherency of said selected seismic traces and said surrounding seismic traces.

19. For an experiment which obeys the wave equation and which produces a series of data traces of data points as a function of time, said series of data traces including at least one null trace, a method of interpolating data for said at least one null trace comprising the steps of:

relating said series of data traces to a first datum;

propagating said series of data traces related to said first datum to a fictitious second datum using forward wave equation datuming at a first velocity to create a second series of data traces;

propagating said second series of data traces back to said first datum using backward wave equation datuming at said first velocity to interpolate data traces for said at least one null trace; and producing a series of data traces for said experiment from said series of data traces and said produced data traces for said at least one null trace.

20. The method according to claim 19 wherein the step of propagating said series of data traces related to said first datum to said second datum is propagated according to the equation:

$$U_{out(t)} = \frac{1}{\pi} \sum_i \Delta x_i \cos\theta_i \frac{t_i}{r_i} \overline{Q}(t - t_i)$$

where:

$U_{out(t)}$ is one of said second series of data traces;

i is the location of said first series of data traces on said first datum;

$\Delta x_i$ is the separation between adjacent data traces locations for said first datum;

$t_i$ is the traveltime between a first data trace related to said first datum and a second data trace related to said second datum;

$r_i$ is the distance between said first data trace related to said first datum and said second data trace related to said second datum;

$\theta_i$ is the angle between $r_i$ and a normal to said first datum; and $\overline{Q}(t-t_i)$ is a representation of said first data trace at location i delayed by the traveltime $t_i$ and convolved with a time-domain shaping operator where the shaping operator effects a half derivative of the original input trace which is equivalent to multiplying each frequency component of the trace by $\sqrt{iw}$, where $i=\sqrt{-1}$, and w is frequency.

21. The method according to claim 19 wherein the stet of propagating said second series of data traces related to said second datum to produce data components for said at least one null trace is propagated according to the equation:

$$U_{out(t)} = \frac{1}{\pi} \sum_i \Delta x_i \cos\theta_i \frac{t_i}{r_i} \overline{Q}(t + t_i)$$

where:

$U_{out(t)}$ is one of said produced data traces;

i is the location of said second series of data traces for said second datum;

$\Delta x_i$ is the separation between adjacent data traces locations for said second datum;

$t_i$ is the traveltime between a first data trace related to said second datum and a second data trace related to said first datum;

$r_i$ is the distance between said first data trace related to said second datum and said second seismic trace related to said first datum;

$\theta_i$ is the angle between $r_i$ and a normal to said second datum; and $\overline{Q}(t+t_i)$ is a representation of said first data trace at location i delayed by the traveltime $t_i$ and convolved with a time-domain shaping operator where the shaping operator effects a half derivative of the original input trace which is equivalent to multiplying each frequency component of the trace by $\sqrt{iw}$, where $i=\sqrt{-1}$, and w is frequency.

22. The method according to claim 19 wherein the step of producing a series of data traces for said experiment from said series of data traces and said produced data traces for said at least one null trace further comprises the steps of:

producing a third series of data traces related to said first datum;

selecting individual data traces of said third series of data traces corresponding to said null traces; and replacing said null traces with said selected data traces.

23. The method according to claim 22 further comprising the steps of:

comparing said selected data traces to said surrounding data traces;

determining whether said selected data traces are correct interpolations of said null traces based on said comparison; and repeating said first propagating step, said second propagating step and said selecting step to produce a next interpolated data trace from the new traces if said determining step determines that said selected data traces are not correct interpolations of said null trace.

24. The method according to claim 23 wherein said step of comparing said selected seismic traces to said surrounding data traces further comprises the step of determining coherency of said selected data traces and said surrounding data traces.

* * * * *

UNITED STATES PATENT AND TRADEMARK OFFICE
CERTIFICATE OF CORRECTION

PATENT NO. : 4,887,244

DATED : December 12, 1989

INVENTOR(S) : Willis et al.

It is certified that error appears in the above-identified patent and that said Letters Patent is hereby corrected as shown below:

Col. 3, line 17, "t" should be -- a --

Col. 4, line 66, "object" should be -- objects --

Col. 5, line 48, the portion which reads "$\frac{t_i}{\eta}$" should be -- $\frac{t_i}{r_i}$ --

Col. 11, line 18, "therein" should be -- wherein --

Col. 11, line 27, "on" should be --one--, and "tart" should be --part--

Col. 11, lines 44-45, "travaltime" should be -- traveltime --

Col. 12, line 33, After "lated to said" add -- second datum --

Col. 12, line 68, After "normal" insert -- to said second --

Col. 13, line 26, Afte the first instance of "step" insert -- , said second ----

Col. 13, line 65, "it" should be -- is --

Signed and Sealed this

Second Day of July, 1991

*Attest:*

HARRY F. MANBECK, JR.

*Attesting Officer*   *Commissioner of Patents and Trademarks*